(12) United States Patent
Tomoe et al.

(10) Patent No.: US 7,884,040 B2
(45) Date of Patent: Feb. 8, 2011

(54) OPTICAL GLASS

(75) Inventors: Hiroaki Tomoe, Sagamihara (JP); Masahiro Onozawa, Sagamihara (JP)

(73) Assignee: Ohara Inc., Sagamihara-shi (JP)

( * ) Notice: Subject to any disclaimer, the term of this patent is extended or adjusted under 35 U.S.C. 154(b) by 341 days.

(21) Appl. No.: 12/047,548

(22) Filed: Mar. 13, 2008

(65) Prior Publication Data
US 2008/0254966 A1    Oct. 16, 2008

(30) Foreign Application Priority Data
Apr. 16, 2007    (JP) .............................. 2007-106799

(51) Int. Cl.
  *C03C 3/062*    (2006.01)
(52) U.S. Cl. .............................. 501/73; 501/77; 501/79
(58) Field of Classification Search .................... 501/63, 501/73, 77, 79
See application file for complete search history.

(56) References Cited

U.S. PATENT DOCUMENTS

| | | | |
|---|---|---|---|
| 4,734,389 A * | 3/1988 | Grabowski et al. ............ | 501/73 |
| 7,015,164 B2 * | 3/2006 | Kasuga et al. ................. | 501/73 |
| 2002/0042337 A1 | 4/2002 | Zou et al. | |
| 2003/0096694 A1 | 5/2003 | Kasuga et al. | |
| 2005/0026768 A1 * | 2/2005 | Shimizu et al. ................ | 501/73 |
| 2006/0105897 A1 | 5/2006 | Kasuga et al. | |

FOREIGN PATENT DOCUMENTS

| | | | |
|---|---|---|---|
| CN | 1915875 A | * | 2/2007 |
| JP | 52-25812 | | 2/1977 |
| JP | 59-8637 A | | 1/1984 |
| JP | 60-5037 A | | 1/1985 |
| JP | 01148726 A | * | 6/1989 |
| JP | 08175841 A | * | 7/1996 |
| JP | 2001-342035 A | | 12/2001 |
| JP | 2002-249336 A | | 9/2002 |
| JP | 2004-155639 A | | 6/2004 |
| JP | 2005-306733 A | | 11/2005 |
| WO | WO 2008028341 A1 | * | 3/2008 |

* cited by examiner

*Primary Examiner*—Karl E Group
*Assistant Examiner*—Elizabeth A Bolden
(74) *Attorney, Agent, or Firm*—Westerman, Hattori, Daniels & Adrian, LLP

(57) ABSTRACT

Optical glass has a refractive index of 1.83 or above and an Abbe number of 26 or less and contains $SiO_2$, $TiO_2$, $Nb_2O_5$ and $Na_2O$ as its essential constituents in such proportions on a final oxide basis that the amounts of its oxide constituents as expressed on a mass percentage basis may satisfy the relationship:

$(TiO_2+Nb_2O_5)/(Na_2O+K_2O)=3.0$ to $4.0$.

7 Claims, No Drawings

OPTICAL GLASS

FIELD OF THE INVENTION

The present invention relates to optical glass having a high refractive index and high dispersion. More particularly, it relates to optical glass having good resistance to coloring and devitrification, as well as a high refractive index and high dispersion.

BACKGROUND OF THE INVENTION

The recent progress of digital and highly precise optical apparatus and instruments has brought about a rapid increase in a demand for lenses and other optical elements for digital and video cameras and, among others, an ever-increasing demand for highly refractive and highly dispersive glass as desired from an optical engineering standpoint. Highly refractive and highly dispersive optical glass having a refractive index of 1.8 or above and an Abbe number of 30 or less is disclosed in a number of documents including the following:

(1) Patent Document 1—JP-A-S60-5037

(2) Patent Document 2—JP-A-S59-8637

(3) Patent Document 3—JP-A-2001-342035

(4) Patent Document 4—JP-A-2004-155639

Patent Document 1 discloses $SiO_2$—$TiO_2$—$Nb_2O_5$—BaO—PbO—$Na_2O$ type optical glass containing PbO as its essential constituent and having high refractivity and high dispersion. Patent Document 2 discloses $SiO_2$—$P_2O_5$—$TiO_2$—BaO—$R_2O$ type optical glass not containing PbO, but having high refractivity and high dispersion. Patent Document 3 discloses $SiO_2$—$TiO_2$—$Nb_2O_5$—BaO—$Na_2O$ type optical glass not containing PbO, $As_2O_3$ or F, but containing a large amount of $Nb_2O_5$, and having high refractivity and high dispersion. Patent Document 4 discloses $SiO_2$—$TiO_2$—$Nb_2O_5$—BaO—$Na_2O$ type optical glass not containing PbO, $As_2O_3$ or F, but containing a large amount of $TiO_2$, and having high refractivity and high dispersion.

However, the optical glass disclosed in Patent Document 1 has an environmental problem because of its PbO. The optical glass disclosed in Patent Document 2 has its high refractivity and high dispersion difficult to maintain because of its low content of a material imparting high refractivity, such as $Nb_2O_5$.

The optical glass disclosed in Patent Document 3 or 4 is defective in stability and resistance to devitrification at the time of press working, though its high content of a material imparting high refractivity, such as $TiO_2$ or $Nb_2O_5$ make it relatively easy to produce glass of high refractivity and high dispersion.

As it is generally true that while the coloring resistance of glass of high refractivity and dispersion is lowered by $TiO_2$ or $Nb_2O_5$ which it contains for improved refractivity, a reduction of the proportion of $TiO_2$ or $Nb_2O_5$ for the improved coloring resistance of glass makes it difficult to maintain its high refractivity and dispersion, it has been very difficult to obtain those two features at the same time.

Another drawback arising from a high proportion of $TiO_2$ or $Nb_2O_5$ is the devitrification of glass which occurs easily at the time of its reheating and press working, depending on its composition. When an optical element is formed from a glass ingot prepared by melting optical glass, shaping it into a sheet of glass and cutting or otherwise cold working it, its reheating and press working are required, and while glass composed mainly of $SiO_2$ relies on a high proportion of $TiO_2$ or $Nb_2O_5$ for improved refractivity, it is known that $SiO_2$ glass containing a high proportion of $TiO_2$ or $Nb_2O_5$ undergoes devitrification easily when heated to, say, 800° C.

Accordingly, there has been a strong demand for a glass composition which is high in transparency and does not undergo devitrification by any material added to it to give it high refractivity to make an optical element of high refractivity and dispersion.

SUMMARY OF THE INVENTION

We, the inventors of the present invention, have found that even if $SiO_2$—$TiO_2$—$Nb_2O_5$—$Na_2O$ glass may contain a high proportion of $TiO_2$ and $Nb_2O_5$ to obtain high refractivity and dispersion, it is possible to produce optical glass having the desired optical constants, while retaining good coloring and devitrification resistance, if the total amount of $TiO_2$ and $Nb_2O_5$ is limited to have a specific ratio to the amount of the alkali metal oxides.

According to a first aspect of the present invention, therefore, there is provided optical glass having a refractive index of 1.83 or above and an Abbe number of 26 or less and containing $SiO_2$, $TiO_2$, $Nb_2O_5$ and $Na_2O$ as its essential constituents in such proportions on a final oxide basis that the amounts of its oxide constituents as expressed on a mass percentage basis may satisfy the relationship:

$(TiO_2+Nb_2O_5)/(Na_2O+K_2O)=3.0$ to $4.0$

According to a second aspect of the present invention, the optical glass according to the first aspect thereof has 15 or less per 1 $cm^3$ of devitrified spots having a diameter of 20 to 100 μm, while not having any devitrified spot having a diameter over 100 μm, when kept at 800° C. for 10 minutes and thereafter cooled.

According to a third aspect of the present invention, the optical glass according to the first or second aspect thereof contains $TiO_2$ in an amount having a ratio of 1.2 to 2.0 to the amount of $Nb_2O_5$, both on a final oxide and mass percentage basis, and has a spectral transmittance of 70% at a wavelength of 450 nm or less as measured in accordance with the standard of The Japan Optical Glass Manufacturers' Association, JOGIS02-2003, "Method of Measuring the Degree of Coloring of Optical Glass".

According to a fourth aspect of the present invention, the optical glass according to any of the first to third aspects thereof contains 21.0 to 30.0% of $SiO_2$, 24.0 to 40.0% of $TiO_2$, 15.5 to 30.0% of $Nb_2O_5$ and 10.0 to 23.0% of $Na_2O$, as well as 0 to 9.0% of $ZrO_2$ and/or 0 to 25.0% of BaO and/or 0 to 23.0% of $K_2O$ and/or 0 to 1.0% of $Sb_2O_3$, all on a final oxide and mass percentage basis, the amounts of $TiO_2$, $Nb_2O_5$, $Na_2O$ and $K_2O$ satisfying the following relationship:

$(TiO_2+Nb_2O_5)/(Na_2O+K_2O)=3.50$ to $3.85$

According to a fifth aspect of the present invention, the optical glass according to any of the first to fourth aspects thereof contains 25.0 to 40.0% of $TiO_2$, 16.0 to 30.0% of $Nb_2O_5$ and 2.0 to 25.0% of BaO, all on a final oxide and mass percentage basis, the amounts of $TiO_2$, $Nb_2O_5$ and $Na_2O$ satisfying the following relationship:

$(TiO_2+Nb_2O_5)/(Na_2O)=3.50$ to $3.85$

According to a sixth aspect of the present invention, the optical glass according to any of the first to fifth aspects thereof further contains 0 to 3.0% of $B_2O_3$ and/or 0 to 4.0% of $Al_2O_3$ and/or 0 to 5.0% of MgO and/or 0 to 5.0% of CaO and/or 0 to 5.0% of SrO and/or 0 to 5.0% of ZnO and/or 0 to 5.0% of Li$_2$O and/or 0 to 10.0% of Ta$_2$O$_5$ and/or 0 to 10.0% of WO$_3$, all on a final oxide and mass percentage basis.

According to a seventh aspect of the present invention, the optical glass according to any of the first to sixth aspects thereof contains a total of 0 to 1% of Sb$_2$O$_3$, SnO and SnO$_2$ on a final oxide and mass percentage basis.

The optical glass according to the present invention exhibits the desired optical constants without the sacrifice of coloring or devitrification resistance.

DETAILED DESCRIPTION OF THE INVENTION

Description will now be made in detail of the composition of optical glass according to the present invention. The amounts of its constituents will be shown on a final oxide and mass percentage basis unless otherwise noted. The term "final oxide basis" is herein used to show the amount of each constituent of the glass in a mass percentage which it occupies in a total of 100% by mass of the final oxides on the assumption that all of the oxides, nitrates and other raw materials used to make the glass according to the present invention are decomposed by melting into the final oxides.

The optical glass according to the present invention contains SiO$_2$ as its principal and essential constituent. However, too small an amount thereof is likely to result in glass of low stability and chemical durability, while too large an amount thereof is likely to result in glass which is less easy to melt and low in refractivity. Therefore, its amount is preferably not smaller than 21%, more preferably not smaller than 23% and still more preferably not smaller than 24%, and is preferably not larger than 30%, more preferably not larger than 28% and still more preferably not larger than 27%.

Another essential constituent of the optical glass according to the present invention is TiO$_2$ which is effective for raising the refractivity, dispersion and chemical durability of the glass. However, too small an amount thereof is likely to make it difficult to obtain the desired results, while too large an amount is likely to result in glass of low devitrification resistance, high crystallizability and low coloring resistance. Therefore, its amount is preferably not smaller than 24%, more preferably not smaller than 24% and still more preferably not smaller than 26%, and is preferably not larger than 40%, more preferably not larger than 30% and still more preferably not larger than 27%.

Another essential constituent of the optical glass according to the present invention is Nb$_2$O$_5$ which is effective for raising the refractivity and dispersion of the glass. However, too small an amount thereof is likely to make it difficult to obtain the desired results, while too large an amount is likely to result in glass of low devitrification resistance. Therefore, its amount is preferably not smaller than 15.5%, more preferably not smaller than 16% and still more preferably not smaller than 17%, and is preferably not larger than 30%, more preferably not larger than 25% and still more preferably not larger than 18%.

The amounts of Nb$_2$O$_5$ and TiO$_2$ are preferably in a specific ratio to each other to ensure the stability, high refractivity and coloring resistance of the glass. Too large an amount of Nb$_2$O$_5$ as compared with TiO$_2$ is likely to result in too large an Abbe number for any high dispersion as desired. Too small an amount of Nb$_2$O$_5$ as compared with TiO$_2$ is likely to result in too much coloring and too low transparency for any satisfactory optical glass. Therefore, the ratio of the amount of TiO$_2$ to that of Nb$_2$O$_5$, or the value of TiO$_2$/Nb$_2$O$_5$ is preferably not smaller than 1.2, more preferably not smaller than 1.25 and still more preferably not smaller than 1.3 and is preferably not larger than 2.0, more preferably not larger than 1.95 and still more preferably not larger than 1.90.

Another essential constituent of the optical glass according to the present invention is Na$_2$O which is effective for making glass easier to melt and stabilizing it. However, too small an amount thereof is likely to make it difficult to obtain the desired results, while too large an amount is likely to result in glass of too low refractivity for the desired optical constants. Therefore, its amount is preferably not smaller than 10%, more preferably not smaller than 10.5% and still more preferably not smaller than 11%, and is preferably not larger than 23%, more preferably not larger than 15% and still more preferably not larger than 13%.

The optical glass according to the present invention may optionally contain ZrO$_2$ which can improve its chemical durability and refractivity, but too large an amount thereof is likely to lower its devitrification resistance. Therefore, its amount is preferably not larger than 9%, more preferably not larger than 2% and still more preferably not larger than 1%.

BaO is an important constituent which can promote the melting of glass and make homogeneous glass. However, too large an amount thereof is likely to result in glass of low devitrification resistance and chemical durability. Therefore, its amount is preferably not larger than 25%, more preferably not larger than 20% and still more preferably not larger than 19%. Although this is not an essential constituent of the optical glass according to the present invention, it preferably contains BaO in the amount of not less than 2%, more preferably not less than 10% and still more preferably not less than 16% in order to obtain the advantages as stated above.

Another optional constituent is K$_2$O which is effective for making glass easier to melt and stabilizing it, as Na$_2$O is. However, too large an amount thereof is likely to result in glass of too low refractivity for the desired optical constants. Therefore, its amount is preferably not larger than 23%, more preferably not larger than 15% and still more preferably not larger than 13%.

The ratio of the total amount of Nb$_2$O$_5$ and TiO$_2$ to that of Na$_2$O and K$_2$O in the optical glass according to the present invention, or the value of (Nb$_2$O$_5$+TiO$_2$)/(Na$_2$O+K$_2$O) is preferably within a specific range to maintain its high refractivity and dispersion, while not lowering its coloring or devitrification resistance. This is a range allowing the glass to contain relatively large amounts of Nb$_2$O$_5$ and TiO$_2$ without affecting other physical properties thereof. However, too large a value thereof is likely to result in glass of low coloring and devitrification resistance, while too small a value is likely to result in optical glass of low refractivity failing to exhibit the desired optical constants. Therefore, the value is preferably not larger than 4.0, more preferably not larger than 3.85 and still more preferably not larger than 3.8 and is preferably not smaller than 3.0, more preferably not smaller than 3.5 and still more preferably not smaller than 3.55.

The devitrification resistance of glass as reheated and press worked depends largely on the ratio of the total amount of TiO$_2$ and Nb$_2$O$_5$ to the amount of Na$_2$O. If the ratio of (TiO$_2$+Nb$_2$O$_5$)/Na$_2$O is within a specific range, it is possible to produce optical glass containing large amounts of TiO$_2$ and Nb$_2$O$_5$, and yet having good resistance to coloring and exhibiting high devitrification resistance when reheated and press worked. Therefore, the value of (TiO$_2$+Nb$_2$O$_5$)/Na$_2$O is preferably not smaller than 3.50, more preferably not smaller than 3.55 and still more preferably not smaller than 3.60 and is preferably not larger than 3.85, more preferably not larger than 3.83 and still more preferably not larger than 3.80.

Another optional constituent is B$_2$O$_3$ which can make glass easier to melt, but too large an amount thereof is likely to result in optical glass of low refractivity failing to exhibit the desired optical constants. Therefore, its amount is preferably not larger than 3%, more preferably not larger than 2% and still more preferably not larger than 1%.

Another optional constituent is $Al_2O_3$ which can improve the chemical durability and devitrification resistance of glass, but too large an amount thereof is likely to make glass less easy to melt and lower its refractivity. Therefore, its amount is preferably not larger than 4%, more preferably not larger than 2% and still more preferably not larger than 1%.

Another optional constituent is MgO which can improve the chemical durability of glass, but too large an amount thereof is likely to lower its stability when it is melted. Therefore, its amount is preferably not larger than 5%, more preferably not larger than 2% and still more preferably not larger than 1%.

CaO and SrO are optional constituents which can promote the melting of glass and make homogeneous glass, as BaO can, but too large an amount thereof is likely to result in glass of low devitrification resistance. Therefore, the amount of each of CaO and SrO is preferably not larger than 5%, more preferably not larger than 4% and still more preferably not larger than 3% and the total amount thereof is preferably not larger than 5%, more preferably not larger than 4% and still more preferably not larger than 3%.

ZnO is an optional constituent which can improve the chemical durability of glass, but too large an amount thereof is likely to lower its stability when it is melted. Therefore, its amount is preferably not larger than 5%, more preferably not larger than 2% and still more preferably not larger than 1%.

$Li_2O$ is an optional constituent which can promote the melting of glass, but too large an amount thereof is likely to lower its stability. Therefore, its amount is preferably not larger than 5%, more preferably not larger than 3% and still more preferably not larger than 1%.

$Ta_2O_5$ is an optional constituent which can improve the refractivity of glass, but too large an amount thereof is likely to lower its devitrification resistance and make the stable manufacture of glass difficult. Therefore, its amount is preferably not larger than 10%, more preferably not larger than 5% and still more preferably not larger than 2%.

$WO_3$ is an optional constituent which can improve the refractivity of glass, but too large an amount thereof is likely to lower its devitrification resistance and make the stable manufacture of glass difficult. Therefore, its amount is preferably not larger than 10%, more preferably not larger than 5% and still more preferably not larger than 2%.

The optical glass according to the present invention may contain $Sb_2O_3$, SnO and/or $SnO_2$ as a clarifying agent in the amount preferably not larger than 1%, more preferably not larger than 0.5% and still more preferably not larger than 0.3%. The amount of each of $Sb_2O_3$, SnO and $SnO_2$ is not larger than 1%.

The optical glass according to the present invention should not contain any lead compound, since it is easily fused to a mold used in precision press forming, and since it requires environmental measures to be taken in connection with the manufacture of glass, its cold working, such as grinding, and its disposal and thereby imposes a great burden on the environment.

The optical glass according to the present invention should not contain any fluorine, either, since it is likely to cause striae when a glass ingot is formed from molten glass.

The optical glass according to the present invention should not contain any $As_2O_3$, cadmium or thorium, either, since they are likely to exert a harmful effect on the environment and imposes a great burden thereon.

The optical glass according to the present invention is preferably free from any coloring element, such as V, Cr, Mn, Fe, Co, Ni, Cu, Mo, Eu, Nd, Sm, Tb, Dy or Er. No such element should be added, though they may occur as unavoidable impurities.

Referring now to its physical properties, the optical glass according to the present invention has a high refractive index and high dispersion to meet the requirements of optical engineering. It preferably has a refractive index of 1.83 or above, more preferably 1.831 or above and still more preferably 1.832 or above and an Abbe number of 26 or less, more preferably 25 or less and still more preferably 24 or less.

The optical glass according to the present invention preferably has a high light transmittance, since a molded product thereof is intended as a lens or like optical element. More specifically, the shortest wavelength ($\lambda 70$) giving a light transmittance of 70% or more is preferably 450 nm, more preferably 440 nm and still more preferably 430 nm, as calculated from a spectral transmittance curve including reflection loss in accordance with the standard of The Japan Optical Glass Manufacturers' Association, JOGIS02-2003, "Method of Measuring the Degree of Coloring of Optical Glass".

The optical glass according to the present invention is preferably high in devitrification resistance, particularly as reheated and press worked. Its devitrification resistance is determined by holding glass for 10 minutes at a temperature of 800° C. which is usually employed for molding $SiO_2$—$TiO_2$ optical glass of high refractivity and dispersion, thereby reproducing its thermal history of repeating and press working and counting the number of the resulting devitrified spots per unit volume. The number of devitrified spots is employed as a measure for the devitrification resistance of glass, since it is known from experience that there is a certain correlation between the number of devitrified spots and the likelihood of glass to devitrify during its reheating and press working.

The devitrified spots to be counted are limited to ones having a diameter of 20 to 100 μm and no product having even a single devitrified spot having a diameter over 100 μm is acceptable as the optical glass according to the present invention. No smaller devitrified spot having a diameter below 20 μm presents any substantial disadvantage in the practical use of optical glass, while a devitrified spot having a diameter over 100 μm reduces the light transmittance of glass so seriously that it is hardly useful as optical glass. The optical glass according to the present invention preferably has not more than 15 devitrified spots having a diameter of 20 to 100 μm per $cm^3$, more preferably not more than 12 and still more preferably not more than 10. No devitrified spot having a diameter over 100 μm is desirable.

The term "diameter" of a devitrified spot as herein used means the major diameter of any substantially oval devitrified spot as found in a sample of glass. If the shape of any devitrified spot greatly differs from oval, the diameter of the smallest circle circumscribing its shape is regarded as its diameter.

EXAMPLES

The invention will now be described by way of several examples thereof, though the following description is not intended for limiting the scope of the present invention.

Table 1 shows the composition of optical glass according to Examples 1 to 2 of the present invention and according to Comparative Example A, the refractive index (nd), Abbe number (vd) and $\lambda 70$ (nm) of each glass and the result of a devitrification test on each glass (the number of devitrified spots per $cm^3$). The composition of each glass is shown on a final oxide and mass percentage basis.

The glass according to each of Examples 1 to 4 and Comparative Example A was obtained by preparing such amounts of raw materials including oxides, carbonates and hydroxides as to produce 400 g of glass, mixing them thoroughly, heating their mixture in a platinum crucible for 3 to 10 hours in an electric resistance furnace having a temperature of 1,100° C. to 1,300° C. to melt it, clarifying the molten mixture, stirring it to homogenize it, casting it into a metallic mold and cooling the cast product slowly at a rate of 75° C. per hour.

The refractive index (nd) and Abbe number (vd) of each glass thus obtained were determined after slow cooling at a rate of −25° C. per hour in accordance with the standard of The Japan Optical Glass Manufacturers' Association, JOGIS01-2003, "Method of Determining the Refractive Index of Optical Glass". The devitrification test of each glass was conducted by preparing a specimen measuring 15 mm by 15 mm by 30 mm, heat treating it at 800° C. for 10 min., cutting a cube measuring 10 mm by 10 mm by 10 mm from the interior of the specimen and counting the devitrified spots in the cube. The devitrified spots which were counted were ones having a diameter of 20 to 100 μm as located through a microscope of 50 magnifications.

spot having a diameter over 100 μm, when kept at 800° C. for 10 minutes and thereafter cooled.

3. Optical glass as set forth in claim 1, containing $TiO_2$ in an amount having a ratio of 1.2 to 2.0 to the amount of $Nb_2O_5$, both on a final oxide and mass percentage basis, and having a spectral transmittance of 70% at a wavelength of at most 450 nm as measured in accordance with the standard of The Japan Optical Glass Manufacturers' Association, JOGIS02-2003, "Method of Measuring the Degree of Coloring of Optical Glass".

4. Optical glass as set forth in claim 1, further comprising, on a final oxide and mass percentage basis, one or more compounds selected from the group of:
   0 to 9.0% of $ZrO_2$,
   0 to 25.0% of BaO,
   0 to 23.0% of $K_2O$, and
   0 to 1.0% of $Sb_2O_3$,

TABLE 1

|  | Example 1 | Example 2 | Example 3 | Example 4 | Comparative Example A |
|---|---|---|---|---|---|
| $SiO_2$ | 25.50 | 27.10 | 26.00 | 25.63 | 28.90 |
| $Na_2O$ | 11.50 | 12.00 | 11.81 | 12.46 | 10.50 |
| BaO | 17.90 | 14.35 | 17.13 | 17.19 | 13.10 |
| $TiO_2$ | 27.00 | 26.40 | 26.86 | 26.97 | 30.60 |
| $Nb_2O_5$ | 17.00 | 19.10 | 17.25 | 16.88 | 13.10 |
| $ZrO_2$ | 1.00 |  | 0.93 | 0.85 | 2.00 |
| $K_2O$ |  | 1.00 |  |  |  |
| CaO |  |  |  |  | 1.30 |
| $Ta_2O_5$ |  |  |  |  | 0.50 |
| $Sb_2O_3$ | 0.10 | 0.05 | 0.02 | 0.02 |  |
| Total | 100.00 | 100.00 | 100.00 | 100.00 | 100.00 |
| $(TiO_2 + Nb_2O_5)/(Na_2O + K_2O)$ | 3.83 | 3.50 | 3.73 | 3.52 | 4.16 |
| $(TiO_2 + Nb_2O_5)/Na_2O$ | 3.83 | 3.79 | 3.73 | 3.52 | 4.16 |
| nd | 1.8467 | 1.8350 | 1.8429 | 1.8430 | 1.8446 |
| vd | 23.8 | 24.0 | 23.9 | 23.8 | 23.9 |
| λ70 (nm) | 424 | 420 | 416 | 418 | 569 |
| Number of devitrified spots per cm³ | 11 | 14 | 10 | 12 | Uncountable |

According to Examples 1 to 4, the values of $(TiO_2+Nb_2O_5)/(Na_2O+K_2O)$ falling within the specific range made it possible to make press formed products not devitrified despite the presence of large amounts of $TiO_2$ and $Nb_2O_5$, but having good resistance to coloring. On the other hand, the product of Comparative Example A was too low in coloring and devitrification resistance to be of use as optical glass, though its refractive index was of the desired level.

What is claimed is:

1. Optical glass comprising, on a final oxide basis and mass percentage basis:
   23.0 to 30.0% of $SiO_2$,
   24.0 to 40.0% of $TiO_2$,
   16.88 to 30.0% of $Nb_2O_5$ and
   10.5 to 23.0% of $Na_2O$,
   wherein amounts of $TiO_2$, $Nb_2O_5$, $Na_2O$ and $K_2O$ satisfy the relationship:
   $(TiO_2+Nb_2O_5)/(Na_2O+K_2O)=3.0$ to 3.85, and
   $TiO_2/Nb_2O_5 \leq 2.0$
   the optical glass contains no lead component, and
   the optical glass has a refractive index of at least 1.83 and an Abbe number of at most 26.

2. Optical glass as set forth in claim 1, wherein the optical glass has 15 or less per 1 cm³ of devitrified spots having a diameter of 20 to 100 μm, while not having any devitrified wherein the amounts of $TiO_2$, $Nb_2O_5$, $Na_2O$ and $K_2O$ satisfy the following relationship: $(TiO_2+Nb_2O_5)/(Na_2O+K_2O)=3.50$ to 3.85.

5. Optical glass as set forth in claim 1, comprising, on a final oxide and mass percentage basis:
   25.0 to 40.0% of $TiO_2$, and
   2.0 to 25.0% of BaO,
   wherein the amounts of $TiO_2$, $Nb_2O_5$ and $Na_2O$ satisfy the following relationship: $(TiO_2+Nb_2O_5)/(Na_2O)=3.50$ to 3.85.

6. Optical glass as set forth in claim 1, further comprising, on a final oxide and mass percentage basis, one or more compounds selected from the group of:
   0 to 3.0% of $B_2O_3$,
   0 to 4.0% of $Al_2O_3$,
   0 to 5.0% of MgO,
   0 to 5.0% of CaO,
   0 to 5.0% of SrO,
   0 to 5.0% of ZnO,
   0 to 5.0% of $Li_2O$,
   0 to 10.0% of $Ta_2O_5$,
   0 to 10.0% of $WO_3$.

7. Optical glass as set forth in claim 1, further comprising, on a final oxide and mass percentage basis, a total of 0 to 1% of one or more compounds selected from the group of: $Sb_2O_3$, SnO and $SnO_2$.

* * * * *